United States Patent

Schoenbrunn

[15] 3,679,745

[45] July 25, 1972

[54] HYDRATION OF ACRYLONITRILE

[72] Inventor: Erwin Frederick Schoenbrunn, Ridgefield, Conn.

[73] Assignee: American Cyanamid Company, Stamford, Conn.

[22] Filed: April 22, 1970

[21] Appl. No.: 31,012

[52] U.S. Cl..................260/561 N, 260/557 R, 260/558 R, 260/561 R
[51] Int. Cl........................................C07c 103/08
[58] Field of Search.................260/561 N, 561 R, 558, 557

[56] References Cited

UNITED STATES PATENTS 3,499,879  3/1970  Kobayashi et al..............260/561 R X

FOREIGN PATENTS OR APPLICATIONS 1,159,428  12/1963  Germany........................260/561 N

*Primary Examiner*—Lewis Gotts
*Assistant Examiner*—Ethel G. Love
*Attorney*—Gordon L. Hart

[57] ABSTRACT

Acrylamide is produced by hydration of nitriles with water in presence of cuprous dihydrogen phosphate catalyst. The catalyst is preferably generated in situ by reaction of cuprous oxide with phosphoric acid.

4 Claims, No Drawings

HYDRATION OF ACRYLONITRILE

The invention relates to catalytic hydration of nitriles in aqueous solution to make amides.

U.S. Pat. No. 3,381,034 described a catalytic process involving hydrolysis of nitriles with water in the presence of copper salts and preferably also metallic copper. The catalyst operative in that process was described as comprising cupric ions preferably in combination with cuprous ions and metallic copper. The present invention, unlike the patent, employs a cuprous salt as the operative catalyst without need for either cupric ion or copper in the reaction mixture.

An object of the present invention is to provide a process for catalytic hydration of nitriles with high conversion and selectivity.

According to the invention, I have discovered a selected cuprous salt effective as the catalyst to obtain substantial conversion and selectivity in the hydration of nitriles with water to make amides. Outstanding conversion and selectivity are obtained with catalysts comprising cuprous acid phosphates as compared with cuprous salts having other anions.

In a process according to the invention, superior conversion and selectivity are obtained with catalyst comprising cuprous dihydrogen phosphate.

The catalyst is most conveniently prepared in situ by reacting cuprous oxide with phosphoric acid in solution. Best results are obtained using 1 mole of cuprous oxide with two moles phosphoric acid, although more or less than this optimum proportion of the phosphoric acid reactant with cuprous oxide will give a catalyst system for obtaining significant conversions with good selectivity. Increasing the amount of phosphoric acid in solution above the optimum quantity tends to increase the formation of acrylic acid with some consequent loss of selectivity of conversion of the nitrile to the amide. Reducing the proportion of phosphoric acid below the optimum amount reduces the amount of the active cuprous dihydrogen phosphate by the amount of the deficiency, with a consequent reduction of the rate of conversion of nitrile to amide.

The process is operable within rather wide ranges of operating conditions. The pH is not a critical factor but we prefer to operate in the range from about 0.5 to about 6. The process is operable at higher pH values up to about 10 – 12. Reaction temperature is from about 25° to 250° C. preferably about 100° to 150° C.; generally, increase of temperature increases the reaction rate. Pressure is not critical; it should be sufficient to maintain liquid phase and may be from below atmospheric up to about 30,000 psig. Relative amounts of water and nitrile may range from less than stoichiometric amount of water (1 mole water per nitrile group in a mole of the nitrile) up to several moles excess water. The amount of catalyst may be varied as desired, bearing in mind that lesser concentration of catalyst usually requires longer reaction time to obtain a given percent conversion. We prefer to operate the process with from 0.03 to 0.15 moles cuprous ion per chemical equivalent of nitrile. The maximum amount of catalyst is limited only the solubility of cuprous dihydrogen phosphate and the maximum conversion will be obtained with a saturated solution although economical conversions are obtained with lesser concentration which may be preferred for some embodiments of the process.

EXAMPLE 1

A series of reactions are run, using for each a reaction mixture of 1.5 gm. water and 1.2 gm. acrylonitrile to which is added 0.001 gm. hydroquinone as a polymerization inhibitor, 0.20 gm. cuprous oxide, and an acid of the kind and in the amount shown in Table 1 for the respective reactions. In each reaction mixture the cuprous oxide and the selected acid will form ionized cuprous salts which provide the catalyst system. The reaction mixture is heated for 4 hours in a closed reactor at autogenic pressure at 125° C. with constant agitation by rocking of the reactor. At the end of 4 hours the reactor is opened and the contents are analyzed. From the results of the analysis, the percent conversion of acrylonitrile and percent selectivity of conversion to acrylamide are computed. Results are tabulated in Table 1.

TABLE 1

| wt., Acid g. | Moles acid per gram atom copper ($Cu^+$) | Conversion of Acrylonitrile to Product, % | | | Selectivity to AMD, % |
|---|---|---|---|---|---|
| | | AMD | HAN | AA | |
| Boric acid, 0.16 fused | 0.95 | 0 | 1 | 1 | 1 |
| Isobutyric 0.22 Acid | 0.91 | 2 | 1 | 0 | 60 |
| Hydriodic 0.78 acid 47% | 1.03 | 0 | 0 | 1 | 23 |
| Formic acid, 0.15 90% | 1.05 | 4 | 11 | 0 | 24 |
| Hydrochloric 0.25 Acid, 38% | 0.93 | 22 | 25 | 7 | 40 |
| sulfuric acid, 0.13 Conc. | 0.47 | 8 | 10 | 1 | 43 |
| Oxalic acid, 0.33 Dihydrate | 0.94 | 1 | 0 | 1 | 56 |
| Phosphoric 0.34 Acid, 86% | 1.06 | 70 | 4 | 8 | 86 |
| Phosphoric 0.20 | 0.53 | 42 | 6 | 2 | 84 |

Notes: AMD = acrylamide; HAN = hydroacrylonitrile and AA = acrylic acid.

The relatively better conversion and selectivity of the cuprous salt of phosphoric acid for the acrylamide synthesis, as compared with other cuprous salts, is demonstrated in Table 1. Optimum conversion and selectivity at about 1 mole (1.06 in Table 1) acid per gram atom copper indicates the most active salt is the cuprous dihydrogen phosphate.

It is preferred to operate the process of the invention in absence of molecular oxygen and this can be conveniently accomplished by covering the reaction mixture with an atmosphere of nitrogen or other inert gas. This is not a critical requirement for the process but it will prolong the catalyst life by preventing catalyst oxidation. The catalyst is preferably prepared as in the examples by reaction of cuprous oxide with phosphoric acid, but the same catalyst may be prepared by other means, as by a metathetical reaction of cuprous chloride with sodium phosphate, for example.

In an aqueous solution of cuprous dihydrogen phosphate without nitrile present, the cuprous ion $Cu^+$ will disproportionate to cupric ion $Cu^{++}$ and elemental copper $Cu^0$, showing the blue color characteristic of cupric salts and visible formation of insoluble elemental copper. However, when a nitrile is present in the solution, as is the case for example in those embodiments of the present invention using acrylonitrile as the nitrile reactant, the equilibrium tends so much toward the cuprous ion that only negligible or no disproportionation is observed. This observation indicates that in this particular catalyst system it is the cuprous salt that is the active catalyst. It is probably that in addition to the cuprous dihydrogen phosphate some other salts are obtained in minor amounts by the reaction of cuprous oxide with phosphoric acid in the solution. Such other products do not usually appear in significant amounts nor do they appear to be catalytically active. Although the process is operable with such other salts present, the best conversion and selectivity are obtained at the optimum ratio of 1 gram atom copper to 1 mole phosphoric acid and with negligible if any disproportionation of the cuprous ion, which further indicates cuprous dihydrogen phosphate is the active catalyst.

Nitriles other than acrylonitrile are contemplated for use as reactants in various embodiments of the invention. For example, acetonitrile may be converted to acetamide and benzonitrile to benzamide by the process of the invention. Generally the invention contemplates processes comprising conversion of any nitrile to the corresponding amide by reaction with water in presence of cuprous dihydrogen phosphate. As further examples, such nitriles as succinonitrile, methacrylonitrile, crotononitrile, dicyanocyclobutane, and the like may be hydrated to the corresponding amide by the process of the invention. Conversion and selectivity will, of course, vary depending on selected reaction conditions and the selected nitrile reactant.

I claim:

1. A catalytic process comprising hydration of a nitrile with water in liquid phase in the presence of cuprous dihydrogen phosphate catalyst to make the amide hydration product of said nitrile.

2. A process defined by claim 1 wherein said nitrile is acrylonitrile and said amide product is acrylamide.

3. A process defined by claim 1 wherein said cuprous dihydrogen phosphate is a reaction product formed in situ by reaction of cuprous oxide with phosphoric acid.

4. A process defined by claim 3 wherein said cuprous oxide and phosphoric acid are mixed in proportion of one mole phosphoric acid per gram atom copper.

* * * * *

UNITED STATES PATENT OFFICE
CERTIFICATE OF CORRECTION

Patent No. 3,679,745                      Dated  July 25, 1972

Inventor(s)  Erwin Frederick Schoenbrunn

It is certified that error appears in the above-identified patent and that said Letters Patent are hereby corrected as shown below:

Column 2, Table 1 should be copied as follows:

| Acid | Wt., g | Moles Acid per Gram Atom Copper (Cu+) | Conversion of Acrylonitrile to Product, % | | | Selectivity to AMD, % |
|---|---|---|---|---|---|---|
| | | | AMD | HAN | AA | |
| Boric Acid, fused | 0.16 | 0.95 | 0 | 1 | 1 | 1 |
| Isobutyric Acid | 0.22 | 0.91 | 2 | 1 | 0 | 60 |
| Hydriodic Acid, 47% | 0.78 | 1.03 | 0 | 0 | 1 | 23 |
| Formic Acid, 90% | 0.15 | 1.05 | 4 | 11 | 0 | 24 |
| Hydrochloric Acid, 38% | 0.25 | 0.93 | 22 | 25 | 7 | 40 |
| Sulfuric Acid, Conc. | 0.13 | 0.47 | 8 | 10 | 1 | 43 |
| Oxalic Acid, Dihydrate | 0.33 | 0.94 | 1 | 0 | 1 | 56 |
| Phosphoric Acid, 86% | 0.34 | 1.06 | 70 | 4 | 8 | 86 |
| Phosphoric Acid, 86% | 0.20 | 0.53 | 42 | 6 | 2 | 84 |

Signed and sealed this 8th day of May 1973.

(SEAL)
Attest:

EDWARD M. FLETCHER, JR.
Attesting Officer

ROBERT GOTTSCHALK
Commissioner of Patents